(12) United States Patent
Kitagawa et al.

(10) Patent No.: US 10,458,024 B2
(45) Date of Patent: Oct. 29, 2019

(54) ELECTROCHEMICAL REACTION DEVICE

(71) Applicant: KABUSHIKI KAISHA TOSHIBA, Minato-ku (JP)

(72) Inventors: Ryoto Kitagawa, Setagaya (JP); Satoshi Mikoshiba, Yamato (JP); Akihiko Ono, Kita (JP); Yuki Kudo, Yokohama (JP); Jun Tamura, Chuo (JP); Eishi Tsutsumi, Kawasaki (JP); Yoshitsune Sugano, Kawasaki (JP); Asahi Motoshige, Ota (JP); Masakazu Yamagiwa, Yokohama (JP); Arisa Yamada, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 72 days.

(21) Appl. No.: 15/703,386

(22) Filed: Sep. 13, 2017

(65) Prior Publication Data

US 2018/0119294 A1 May 3, 2018

(30) Foreign Application Priority Data

Oct. 27, 2016 (JP) ................. 2016-210850

(51) Int. Cl.
*C25B 1/10* (2006.01)
*C25B 9/08* (2006.01)
(Continued)

(52) U.S. Cl.
CPC ............. *C25B 1/00* (2013.01); *C25B 1/003* (2013.01); *C25B 1/10* (2013.01); *C25B 3/04* (2013.01);
(Continued)

(58) Field of Classification Search
CPC ........................................................ C25B 3/04
See application file for complete search history.

(56) References Cited

U.S. PATENT DOCUMENTS

| 2012/0228148 A1 | 9/2012 | Wolfowitz |
| 2013/0008800 A1 | 1/2013 | Lakkaraju et al. |

(Continued)

FOREIGN PATENT DOCUMENTS

| DE | 10 2015 201 132 A1 | 7/2016 |
| DE | 10 2015 203 245 A1 | 8/2016 |

(Continued)

OTHER PUBLICATIONS

Machine translation of DE102015201132 of Krause et al, published Jul. 28, 2016. (Year: 2016).*

(Continued)

*Primary Examiner* — Brian W Cohen
(74) *Attorney, Agent, or Firm* — Oblon, McClelland, Maier & Neustadt, L.L.P.

(57) ABSTRACT

An electrochemical reaction device in an embodiment includes: a reaction vessel including a first accommodating part to accommodate a first electrolytic solution containing carbon dioxide, and a second accommodating part to accommodate a second electrolytic solution containing water; a reduction electrode disposed in the first accommodating part; an oxidation electrode disposed in the second accommodating part; a power supply electrode connected to the reduction electrode and the oxidation electrode; and a third accommodating part to mix a first gas component produced in the first accommodating part with the first electrolytic solution after the first gas component is produced.

8 Claims, 6 Drawing Sheets

(51) Int. Cl.
*C25B 15/08* (2006.01)
*C25B 1/00* (2006.01)
*C25B 3/04* (2006.01)

(52) U.S. Cl.
CPC ............... *C25B 9/08* (2013.01); *C25B 15/08* (2013.01); *Y02E 60/366* (2013.01); *Y02P 20/133* (2015.11)

(56) References Cited

U.S. PATENT DOCUMENTS

2013/0230435 A1 9/2013 Teamey et al.
2015/0345034 A1* 12/2015 Sundara .................... C25B 3/04
205/462

FOREIGN PATENT DOCUMENTS

| JP | 2013-510238 | 3/2013 |
| JP | 2013-60616 | 4/2013 |
| JP | 2014-520959 | 8/2014 |
| JP | 2015-54994 | 3/2015 |
| JP | 2015-533947 | 11/2015 |
| WO | WO 2017/153081 A1 | 9/2017 |
| WO | WO 2017/153082 A1 | 9/2017 |

OTHER PUBLICATIONS

Machine translation of DE102015203245 of Krause et al, published Aug. 25, 2016. (Year: 2016).*
Extended European Search Report dated Jan. 23, 2018 in European Patent Application No. 17191056.5, 9 pages.

* cited by examiner

ELECTROCHEMICAL REACTION DEVICE

CROSS-REFERENCE TO RELATED APPLICATION

This application is based upon and claims the benefit of priority from Japanese Patent Application No. 2016-210850, filed on Oct. 27, 2016; the entire contents of which are incorporated herein by reference.

FIELD

Embodiments described herein generally relate to an electrochemical reaction device.

BACKGROUND

In recent years, from the viewpoint of energy problems and environmental problems, an artificial photosynthesis technology is under development which electrochemically reduces carbon dioxide using renewable energy of sunlight artificially by modeling photosynthesis of plants to generate a stockable chemical energy source.

An electrochemical reaction device realizing the artificial photosynthesis technology includes, for example, a photoelectric conversion layer using a semiconductor, an oxidation reaction electrode that oxidizes water ($H_2O$) to produce oxygen ($O_2$), and a reduction reaction electrode that reduces carbon dioxide ($CO_2$) to produce a carbon compound. In such a photoelectrochemical reaction device, the oxidation reaction electrode and the reduction reaction electrode which are electrically connected to the photoelectric conversion layer are immersed in water in which $CO_2$ is dissolved, whereby reduction reaction of $CO_2$ is performed.

The oxidation reaction electrode has, for example, a structure in which an oxidation catalyst oxidizing $H_2O$ is provided on the surface of a photocatalyst, and obtains potential by light energy. The reduction reaction electrode has, for example, a structure in which a reduction catalyst reducing $CO_2$ is provided on the surface of a photocatalyst, and is electrically connected to the oxidation reaction electrode. The reduction reaction electrode obtains electrons from the oxidation reaction electrode and thereby reduces $CO_2$ to produce carbon compounds such as carbon monoxide (CO), formic acid (HCOOH), methanol ($CH_3OH$), methane ($CH_4$), ethanol ($C_2H_5OH$), ethane ($C_2H_6$), ethylene glycol ($C_2H_6O_2$) and the like. In a gas reduction product such as carbon monoxide, methane or the like among them, unreacted $CO_2$ is mixed.

The unreacted $CO_2$, when contained in the gas reduction product, affects the purity of a reduction product or the productivity in a synthesis process using them, and therefore it is necessary to remove $CO_2$ in the reduction product. A conceivable method of removing $CO_2$ from the reduction product is a conventional $CO_2$ removing method such as a chemical adsorption method, membrane separation or the like, but the method increases the number of processes and requires large energy for separation, resulting in difficulty in increasing the energy efficiency of the whole system.

DETAILED DESCRIPTION

According to the embodiments of the present invention, there is provided an electrochemical reaction device that includes: a reaction vessel including a first accommodating part to accommodate a first electrolytic solution containing carbon dioxide, and a second accommodating part to accommodate a second electrolytic solution containing water; a reduction electrode disposed in the first accommodating part; an oxidation electrode disposed in the second accommodating part; a power supply connected to the reduction electrode and the oxidation electrode; and a third accommodating part to mix a first gas component produced in the first accommodating part with the first electrolytic solution after the first gas component is produced.

Embodiments will be described hereinafter with reference to the drawings. Substantially the same components are denoted by the same reference signs, and description thereof may be omitted in some cases in the embodiments. The drawings are schematic, and the relation between thicknesses and plane dimensions of parts, ratios between the thicknesses of the parts and the like may differ from actual ones.

First Embodiment

Figure 1:
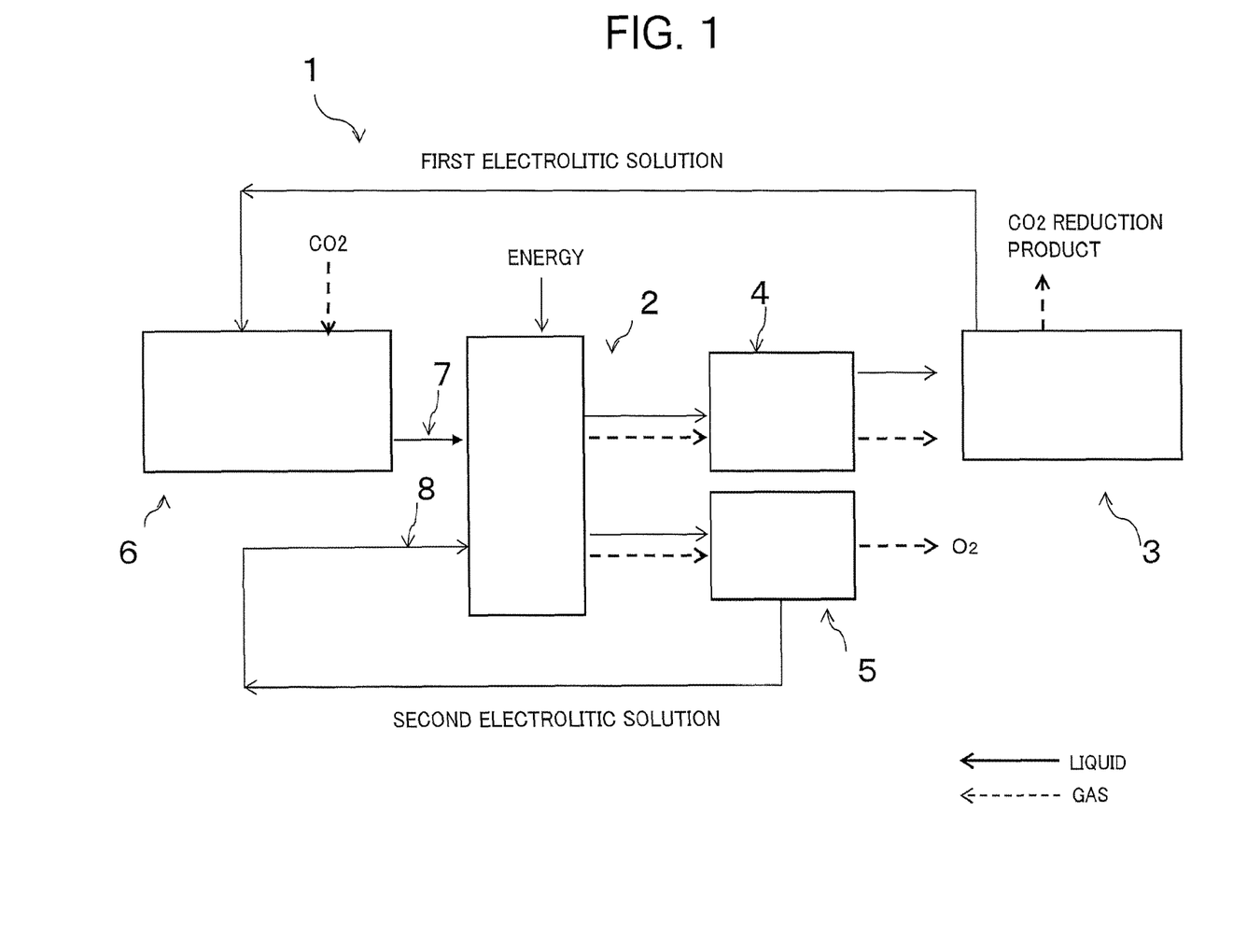
FIG. 1 is a schematic diagram illustrating a functional configuration example of an electrochemical reaction device according to a first embodiment.
Figure 2:
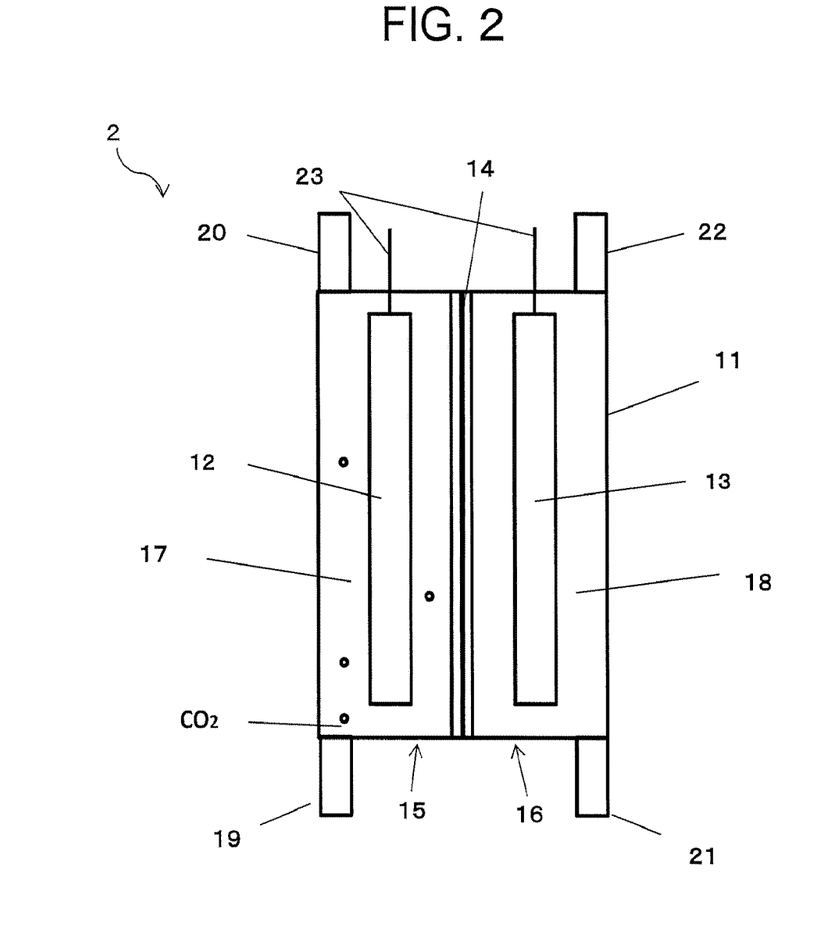
FIG. 2 is a schematic diagram illustrating a configuration example of an electrochemical reaction cell according to the first embodiment.

FIG. 1 is a schematic diagram illustrating a functional configuration example of an electrochemical reaction device according to a first embodiment. FIG. 2 is a schematic diagram of an electrochemical reaction cell used in the electrochemical reaction device according to the first embodiment.

An electrochemical reaction device 1 illustrated in FIG. 1 is composed of an electrochemical reaction cell 2, a first gas/liquid mixing unit 3 (third accommodating part), a first gas/liquid separating unit 4 (fourth accommodating part), a second gas/liquid separating unit 5 (fifth accommodating part), a second gas/liquid mixing unit 6 (sixth accommodating part), a first circulation channel 7, and a second circulation channel 8. Note that though not illustrated, the electrochemical reaction cell 2 is connected to a first electrolytic solution tank storing a first electrolytic solution and to a second electrolytic solution tank storing a second electrolytic solution. Besides, though not illustrated, a circulating pump is arranged as needed among the first circulation channel 7, the second circulation channel 8 and the components.

The electrochemical reaction cell 2 in FIG. 2 includes, in a reaction vessel 11, a reduction electrode 12 that reduces $CO_2$, an oxidation electrode 13, and an ion exchange membrane 14 between the reduction electrode and the oxidation electrode.

The ion exchange membrane 14 forms a reduction electrode chamber 15 (first accommodating part) and an oxidation electrode chamber 16 (second accommodating part), and the reduction electrode chamber 15 is filled with a first electrolytic solution 17 and the oxidation electrode chamber 16 is filled with a second electrolytic solution 18. Note that the reduction electrode 12 and the oxidation electrode 13 illustrated in FIG. 2 are arranged separate from the ion exchange membrane 14, but may be arranged in contact with the ion exchange membrane 14 so as to reduce solution resistance between the electrodes.

The reduction electrode chamber 15 has a first inflow port 19 for introducing the first electrolytic solution 17, and a first outflow port 20 for discharging the first electrolytic solution containing a reduction reaction product. The oxidation electrode chamber 16 has a second inflow port 21 for introducing the second electrolytic solution 18, and a second outflow port 22 for discharging the second electrolytic solution containing an oxidation reaction product. In this case, the first and second outflow ports 21, 22 are preferably set at portions upper than the respective electrodes in order to efficiently discharge gas components containing gas reaction products produced at the reduction electrode 12 and at the oxidation electrode 13 respectively. Further, the reduction electrode chamber 15 and the oxidation electrode chamber 16 may be formed with flow paths to efficiently introduce and discharge the electrolytic solutions.

The reduction electrode 12 and the oxidation electrode 13 have connection terminals 23 so as to be able to electrically connect to the external part via the reaction vessel 11. In the electrochemical reaction cell 2, energy is applied to the reduction electrode 12 and the oxidation electrode 13 via the connection terminals 23 to cause a reduction reaction of, for example, $CO_2$ at the reduction electrode 12 and an oxidation reaction of, for example, water at the oxidation electrode 13.

Examples of electric energy to be inputted include system power supply, external power supplies such as renewable energy of sunlight, wind power, geothermal power, tidal power and the like. Particularly, energy derived from the renewable energy is preferable from the environmental viewpoint. Besides, in the case of the system power supply or the energy by wind power, which is AC supply, the energy is therefore converted into DC using an inverter and then power is inputted to the cell. A driving mode of the cell may be either constant voltage operation or constant current operation.

The electrochemical reaction cell 2 is preferably implemented under pressure and temperature regulation for operation with high efficiency.

As the pressure is higher, the $CO_2$ concentration in the electrolytic solution increases and the reaction efficiency also increases. Accordingly, the operating pressure of the $CO_2$ reduction cell is preferably equal to or higher than the atmospheric pressure. Besides, the upper limit is not particularly limited but is preferably, for example, 7 MPa or lower at which $CO_2$ is not brought into a liquid nor supercritical state.

As the temperature is lower, the amount of dissolution of $CO_2$ becomes higher, but from the viewpoint of the electrochemical reaction, at low temperature, as the solution resistance increases, the theoretical voltage of the reaction disadvantageously increases. On the other hand, when the temperature is high, the amount of dissolution of $CO_2$ decreases advantageously to the electrochemical reaction.

Therefore, the operating temperature condition of the electrochemical reaction cell is preferably an intermediate temperature region, for example, a range equal to or higher than the atmospheric temperature and equal to or lower than the boiling point of the electrolytic solution. In particular when the electrolytic solution is an aqueous solution, the operating temperature condition is preferably 10° C. or higher and 100° C. or lower, and more preferably 25° C. or higher and 80° C. or lower.

The reduction electrode 12 is immersed in the first electrolytic solution 17. The reduction electrode 12 contains, for example, a reduction catalyst for a substance to be reduced. Examples of the reduction catalyst include a material that lowers activation energy for reducing hydrogen ions or carbon dioxide. In other words, a material that lowers an overvoltage when a carbon compound is produced through the reduction reaction of carbon dioxide, can be exemplified. For example, a metal material or a carbon material can be used. As the metal material, a metal such as gold, copper, silver, platinum, palladium, zinc, mercury, indium, or nickel, or an alloy containing the metal can be used. As the carbon material, for example, graphene, carbon nanotube (CNT), fullerene, or ketjen black or the like can be used. Note that the reduction catalyst is not limited to the above but, for example, a metal complex such as a Ru complex or a Re complex, or an organic molecule having an imidazole skeleton or a pyridine skeleton may be used as the reduction catalyst. Further, a plurality of materials may be mixed together.

Though the product obtained by the reduction reaction is different depending on the kind or the like of the reduction catalyst, for example, a carbon compound such as carbon monoxide (CO), formic acid (HCOOH), methane ($CH_4$), methanol ($CH_3OH$), ethane ($C_2H_6$), ethylene ($C_2H_4$), ethanol ($C_2H_5OH$), formaldehyde (HCHO), or ethylene glycol or hydrogen can be obtained. In the embodiment, the product obtained by the reduction reaction is collected via the first outflow port 20.

The reduction electrode 12 may have, for example, a structure in a thin film shape, a lattice shape, a particulate shape, or a wire shape. Besides, the reduction catalyst does not always need to be provided in the reduction electrode 12, and a reduction catalyst layer provided outside the reduction electrode 12 may be electrically connected to the reduction electrode 12.

The product obtained by the oxidation reaction is, for example, oxygen. In the embodiment, oxygen produced by the oxidation reaction is collected via the second outflow port 22.

The oxidation electrode 13 is immersed in the second electrolytic solution 18. The oxidation electrode 13 contains, for example, an oxidation catalyst for a substance to be oxidized. The compound to be produced by the oxidation reaction changes depending on the kind of the oxidation catalyst or the like. Examples of the oxidation catalyst include a material that lowers activation energy for oxidizing water. In other words, a material that lowers an overvoltage when oxygen and hydrogen ions are produced through the oxidation reaction of water can be exemplified. For example, ruthenium, iridium, platinum, cobalt, nickel, iron, manganese and the like can be exemplified. As the oxidation catalyst, a binary metal oxide, a ternary metal oxide, a quaternary metal oxide or the like can be used. Examples of the binary metal oxide include manganese oxide (Mn—O), iridium oxide (Ir—O), nickel oxide (Ni—O), cobalt oxide (Co—O), iron oxide (Fe—O), tin oxide (Sn—O), indium oxide (In—O), ruthenium oxide (Ru—O)

and the like. Examples of the ternary metal oxide include Ni—Fe—O, Ni—Co—O, La—Co—O, Ni—La—O, Sr—Fe—O and the like. Examples of the quaternary metal oxide include Pb—Ru—Ir—O, La—Sr—Co—O and the like. The oxidation catalyst is not limited to the above, and a metal complex such as a Ru complex or an Fe complex may be used as the oxidation catalyst. Further, a plurality of materials may be mixed together. Further, the oxidation electrode may be composed of a composite material containing both the oxidation catalyst and a conductive material. Examples of the conductive material include: carbon materials such as carbon black, activated carbon, fullerene, carbon nanotube, graphene, ketjen black, diamond and the like; transparent conductive oxides such as indium tin oxide (ITO), zinc oxide (ZnO), fluorine-doped tin oxide (FTO), aluminum-doped zinc oxide (AZO), antimony-doped tin oxide (ATO) and the like; metals such as Cu, Al, Ti, Ni, Ag, W, Co, Au and the like; alloys each containing at least one of the metals; and laminated films of the metals. Further, the oxidation catalyst does not always need to be provided in the oxidation electrode 13, and an oxidation catalyst layer provided outside the oxidation electrode 13 may be electrically connected to the oxidation electrode 13.

As the ion exchange membrane 14, an ion exchange membrane such as NEOSEPTA (registered trademark) of ASTOM Corporation, Selemion (registered trademark), Aciplex (registered trademark) of ASAHI GLASS CO., LTD., Fumasep (registered trademark), fumapem (registered trademark) of Fumatech GmbH, Nafion (registered trademark) being fluorocarbon resin made by sulfonating and polymerizing tetrafluoroethylene of E.I. du Pont de Nemours and Company, lewabrane (registered trademark) of LANXESS AG, IONSEP (registered trademark) of IONTECH Inc., Mustang (registered trademark) of PALL Corporation, ralex (registered trademark) of mega Corporation, Gore-Tex (registered trademark) of Gore-Tex Co., Ltd. or the like can be used. Besides, the ion exchange membrane may be composed using a film having hydrocarbon as a basic skeleton or a film having an amine group in anion exchange. When the first electrolytic solution 17 and the second electrolytic solution 18 are different in pH, the electrolytic solutions can be used while stably keeping their pHs by using a bipolar membrane made by stacking a cation exchange membrane and an anion exchange membrane.

Further, other than the ion exchange membrane, for example, porous films such as a silicone resin, fluorine-based resins (perfluoroalkoxyalkane (PFA), perfluoroethylene propene copolymer (FEP), polytetrafluoroethylene (PTFE), ethylene-tetrafluoroethylene copolymer (ETFE), polyvinylidene fluoride (PVDF), polychlorotrifluoroethylene (PCTFE), ethylene-chlorotrifluoroethylene copolymer (ECTFE)), and ceramics may be used. In particular, a hydrophilic porous film never causes clogging due to air bubbles and is thus preferable. Besides, a diaphragm does not always need to be provided.

The first electrolytic solution 17 is preferably a solution with high absorptance of carbon dioxide ($CO_2$). Besides, the form of containing $CO_2$ in the first electrolytic solution does not always need to be in a state of being dissolved therein, but $CO_2$ may exist in an air bubble state in the electrolytic solution. Examples of an aqueous solution system include aqueous solutions in which an electrolyte is dissolved such as $LiHCO_3$, $NaHCO_3$, $KHCO_3$, $CsHCO_3$, and the like. As a non-aqueous solution system, for example, alcohols such as methanol, ethanol, and acetone may be used. The solution containing $CO_2$ is desirably an electrolytic solution containing a $CO_2$ absorbent that lowers the reduction potential of $CO_2$, has high ion conductivity, and absorbs $CO_2$. Examples of the above-described electrolytic solution include ionic liquids made of salts of cations such as imidazolium ions or pyridinium ions and anions such as $BF_4^-$ or $PF_6^-$ and in a liquid state in a wide temperature range, and aqueous solutions thereof. Examples of other electrolytic solutions include amine solutions such as ethanolamine, imidazole, pyridine, and aqueous solutions thereof. The amine may be any one of primary amine, secondary amine, and tertiary amine. Examples of the primary amine include methylamine, ethylamine, propylamine, butylamine, pentylamine, hexylamine and the like. Hydrocarbons of the amine may be substituted by alcohol, halogen and the like. Examples of amine whose hydrocarbons are substituted include methanolamine, ethanolamine, chloromethylamine and the like. Further, an unsaturated bond may exist. These hydrocarbons also apply to the secondary amine and the tertiary amine. Examples of the secondary amine include dimethylamine, diethylamine, dipropylamine, dibutylamine, dipentylamine, dihexylamine, dimethanolamine, diethanolamine, dipropanolamine and the like. The substituted hydrocarbons may be different. This also applies to the tertiary amine. Examples in which hydrocarbons are different include methylethylamine, methylpropylamine and the like. Examples of the tertiary amine include trimethylamine, triethylamine, tripropylamine, tributylamine, trihexylamine, trimethanolamine, triethanolamine, tripropanolamine, tributanolamine, triexanolamine, methyldiethylamine, methyldipropylamine and the like. Examples of the cation of the ionic liquid include 1-ethyl-3-methylimidazolium ion, 1-methyl-3-propylimidazolium ion, 1-butyl-3-methylimdazole ion, 1-methyl-3-pentylimidazolium ion, 1-hexyl-3-methylimidazolium ion and the like. A second place of the imidazolium ion may be substituted. Examples of the imidazolium ion whose second place is substituted include 1-ethyl-2,3-dimethylimidazolium ion, 1,2-dimethyl-3-propylimidazolium ion, 1-butyl-2,3-dimethylimidazolium ion, 1,2-dimethyl-3-pentylimidazolium ion, 1-hexyl-2,3-dimethylimidazolium ion and the like. Examples of the pyridinium ion include methylpyridinium, ethylpyridinium, propylpyridinium, butylpyridinium, pentylpyridinium, hexylpyridinium and the like. In both of the imidazolium ion and the pyridinium ion, an alkyl group may be substituted, or an unsaturated bond may exist. Examples of the anion include fluoride ion, chloride ion, bromide ion, iodide ion, $BF_4^-$, $PF_6^-$, $CF_3COO^-$, $CF_3SO_3^-$, $NO_3^-$, $SCN^-$, $(CF_3SO_2)_3C^-$, bis(trifluoromethoxysulfonyl)imide, bis(perfluoroethylsulfonyl)imide and the like. Dipolar ions in which the cations and the anions of the ionic liquid are coupled by hydrocarbons may be used.

As the second electrolytic solution 18, for example, a solution containing water ($H_2O$) is used. It is preferable to use, as the solution containing $H_2O$, an aqueous solution containing an arbitrary electrolyte. Examples of the aqueous solution containing the electrolyte include aqueous solutions containing phosphate ion ($PO_4^{2-}$), borate ion ($BO_3^{3-}$), sodium ion ($Na^+$), potassium ion ($K^+$), calcium ion ($Ca^{2+}$), lithium ion ($Li^+$), cesium ion ($Cs^+$), magnesium ion ($Mg^{2+}$), chloride ion ($Cl^-$), hydrogen carbonate ion ($HCO_3^-$) and the like. Besides, if containing $H_2O$, a solution common to the first electrolytic solution 17 can be used.

Figure 6:
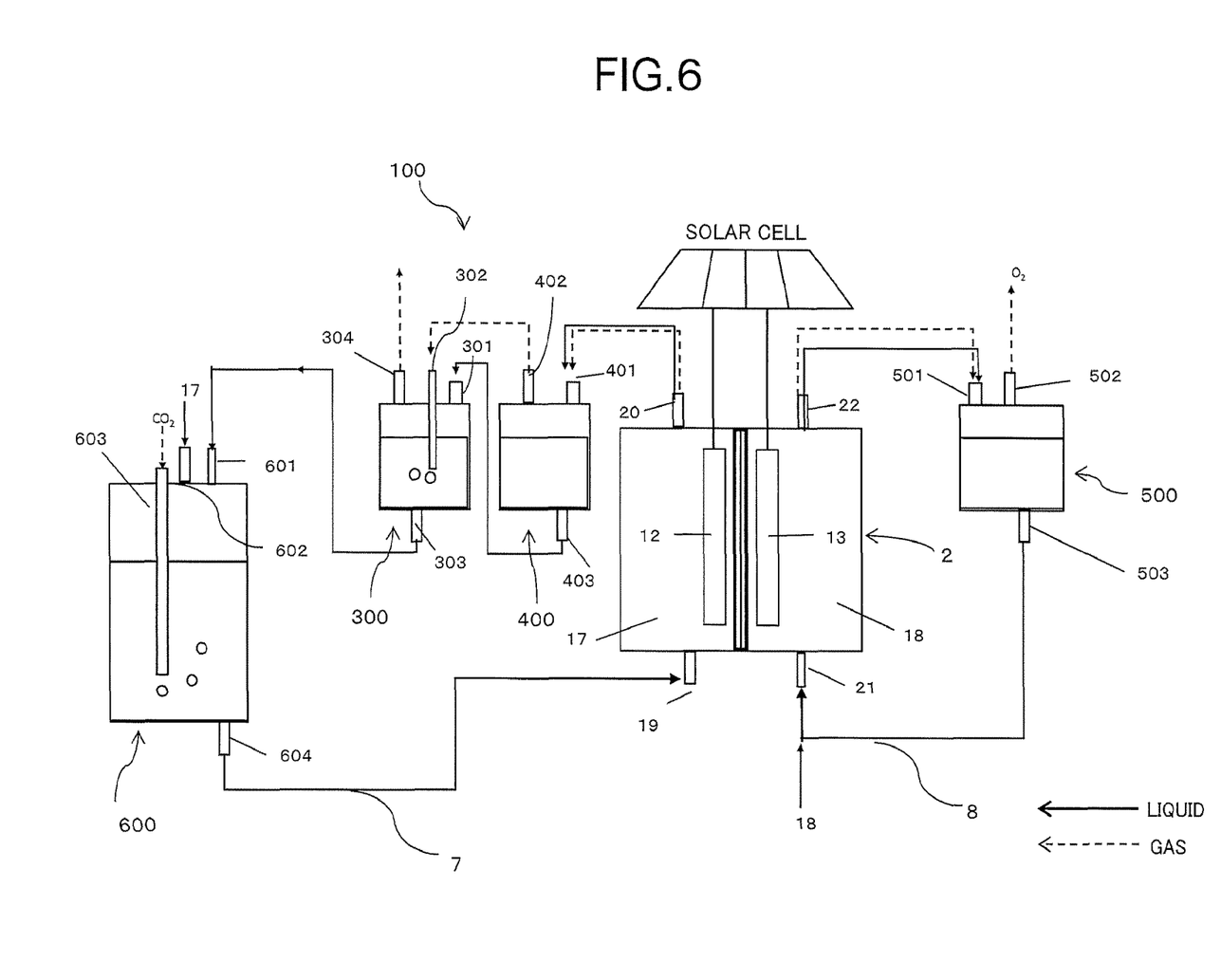
FIG. 6 is a schematic diagram illustrating a configuration example of the electrochemical reaction device according to the first embodiment.

FIG. 6 is a schematic diagram illustrating a configuration of a reduction system by the electrochemical reaction device according to the first embodiment. An electrochemical reaction device 100 illustrated in FIG. 6 is composed of an electrochemical reaction cell 2, a first gas/liquid mixing unit 300, a first gas/liquid separating unit 400, a second gas/ liquid separating unit 500, a second gas/liquid mixing unit 600, a first circulation channel 7, and a second circulation channel 8.

The first gas/liquid separating unit 400 includes a third inflow port 401 for introducing the first electrolytic solution 17 containing the reduction product discharged from the first outflow port 20 of the electrochemical reaction cell 2, a third outflow port 402 for taking out the gas component containing the gas reduction product separated in the first gas/liquid separating unit 400, and a fourth outflow port 403 for taking out the first electrolytic solution after separated from the gas components.

The substance produced at the reduction electrode 12 is sent together with the first electrolytic solution 17 to the first gas/liquid separating unit 400 via the first outflow port 20. In the first gas/liquid separating unit 400, a first gas component such as "gas reduction product, hydrogen being by-product, unreacted $CO_2$" of the reduction product produced therein is separated from the first electrolytic solution, and the former is sent via the third outflow port 402 and the latter is sent via the fourth outflow port 403, to the first gas/liquid mixing unit 300 at the next process. Note that the method of gas/liquid separation is not particularly limited, but methods such as a gravity method, a centrifugal force method, and a surface tension method can be employed.

The first gas/liquid mixing unit 300 has a fourth inflow port 301 for introducing the first electrolytic solution discharged from the fourth outflow port 403, a fifth inflow port 302 for introducing the first gas component discharged from the third outflow port 402, a fifth outflow port 303 for discharging the first electrolytic solution 17 in which the unreacted $CO_2$ of the first gas component is dissolved again, and a sixth outflow port 304 for taking out the gas reduction product not dissolving in the first electrolytic solution but remaining in a gas phase. Examples of the gas reduction product include carbon monoxide, methane, ethane, and ethylene.

In the first gas/liquid mixing unit 300, the first gas component introduced via the fifth inflow port 302 is bubbled in the first electrolytic solution injected from the fourth inflow port 301. In this event, the unreacted $CO_2$ in the first gas component dissolves in the electrolytic solution at efficiency higher than that of other gas product, so that the gas reduction product other than the unreacted $CO_2$ can be efficiently taken out from the sixth outflow port 304.

As described above, in the electrochemical reaction device of the embodiment, a gas mixture of the reduction product and the unreacted $CO_2$ which have been separated once in the first gas/liquid separating unit 400 can be separated simply and with low energy by utilizing the difference in solubility to the first electrolytic solution in the first gas/liquid mixing unit 300. Further, the separated unreacted $CO_2$ dissolves in the first electrolytic solution and therefore is reusable.

Note that the gas/liquid mixing unit is preferably implemented under pressure and temperature regulation for operation with high efficiency similarly to the electrochemical reaction cell. In this event, a safety valve may be attached to the discharge port for $CO_2$. Besides, in particular when the electrolytic solution is an aqueous solution, the temperature of the first gas/liquid mixing unit is preferably 10° C. or higher and 100° C. or lower, and more preferably 25° C. or higher and 80° C. or lower.

The second gas/liquid mixing unit 600 has a sixth inflow port 601 for injecting the first electrolytic solution discharged from the fifth outflow port 303, a seventh inflow port 602 for injecting the first electrolytic solution from a not-illustrated first electrolytic solution tank, an eighth inflow port 603 being a carbon dioxide introducing means for injecting $CO_2$ from a not-illustrated $CO_2$ tank, and a seventh outflow port 604 for sending the first electrolytic solution in which $CO_2$ dissolves to the electrochemical reaction cell 2.

The second gas/liquid mixing unit 600 includes in the electrolytic solution tank, similarly to the first gas/liquid mixing unit 300, an inflow port for the first electrolytic solution, an inflow port and an outflow port for gas, and an outflow port for the electrolytic solution made by gas/liquid mixing. Among them, the first electrolytic solution discharged from the eighth inflow port 603 is returned from the first inflow port 19 to the electrochemical reaction cell 2 through the first circulation channel 17, and is reusable.

The second gas/liquid separating unit 500 includes a ninth inflow port 501 for introducing the second electrolytic solution containing the oxidation product discharged from the second outflow port 22, a ninth outflow port 502 for taking out the gas oxidation product (second gas component) separated in the second gas/liquid separating unit 500, and a tenth outflow port 503 for taking out the second electrolytic solution after separation.

The substance produced at the oxidation electrode 13, for example, oxygen is sent together with the second electrolytic solution to the second gas/liquid separating unit 500, and separated into oxygen and the electrolytic solution similarly in the first gas/liquid separating unit 400. The gas oxidation product separated here can be released to the atmosphere or collected to be effectively used. Besides, the second electrolytic solution after separation is returned from the second inflow port 21 to the electrochemical reaction cell 2 through the second circulation channel 8 and reused.

According to the embodiment, the first gas component separated once in the first gas/liquid separating unit 400, namely, the gas reduction product, hydrogen gas, unreacted $CO_2$ gas are mixed again into the first electrolytic solution in the first gas/liquid mixing unit 300. $CO_2$ in the first electrolytic solution in the first gas/liquid mixing unit 300 has been converted into the reduced substance by the reduction reaction in the electrochemical reaction cell 2 and consumed, and is therefore low in concentration, so that the first electrolytic solution has again an available capacity to absorb $CO_2$. For this reason, in the first gas/liquid mixing unit 300, only the unreacted $CO_2$ is selectively dissolved by mixing again the first gas component injected from the inflow port 302 and the first electrolytic solution and bringing them into contact. Accordingly, it becomes possible to remove the unreacted $CO_2$ gas simply and with low energy.

Note that in this event, it is desirable that the solubility of the gas reduction reaction product and hydrogen to the electrolytic solution is lower than that of $CO_2$. For example, when the gaseous $CO_2$ reduction reaction product is carbon monoxide, methane, ethane, or ethylene and the electrolytic solution is aqueous, the amount of dissolution of these reduction products to water is much lower than the amount of dissolution of $CO_2$, so that it is possible to selectively remove only $CO_2$ with high efficiency.

Further, according to the embodiment, heat exchange may be performed among the electrochemical reaction cell, the gas/liquid separating unit, and the gas/liquid mixing unit using a heat exchanger as needed. For example, in the case where the electrochemical reaction cell is operated at high temperature and the gas/liquid mixing unit is operated at low temperature, the heat exchanger is installed between the electrochemical reaction cell and the gas/liquid mixing unit to perform heat exchange, thereby making it possible to suppress input of energy from the outside for temperature regulation, resulting in increased energy use efficiency of the system.

Second Embodiment

Figure 3:
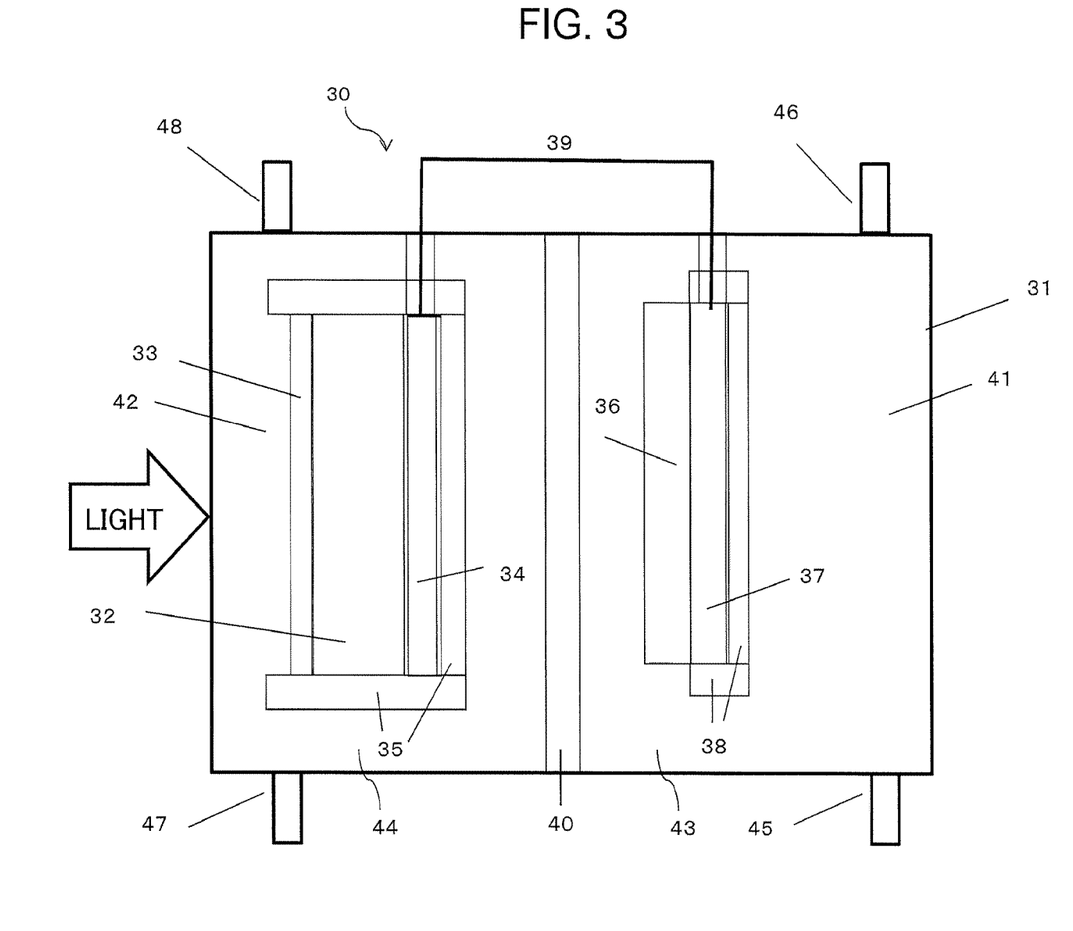
FIG. 3 is a schematic diagram illustrating a configuration example of an electrochemical reaction cell according to a second embodiment.

An electrochemical reaction cell according to a second embodiment will be described referring to FIG. 3. FIG. 3 is a diagram illustrating an electrochemical reaction cell 30 according to the second embodiment.

The electrochemical reaction cell 30 in the second embodiment includes a solar cell in a reaction vessel. This configuration enables an electrochemical reaction system self-sustaining and requiring no external power supply.

The electrochemical reaction cell 30 illustrated in FIG. 3 includes a reaction vessel 31, a photoelectric conversion layer 32, an oxidation catalyst layer 33, an oxidation electrode layer 34, a first insulator 35, a reduction catalyst layer 36, a reduction electrode layer 37, a second insulator 38, a wire 39, an ion exchange membrane 40, a first electrolytic solution 41, and a second electrolytic solution 42.

The reaction vessel 31 has a reduction electrode chamber 43 that accommodates the first electrolytic solution 41, and an oxidation electrode chamber 44 that accommodates a second electrolytic solution 42. The shape of the reaction vessel 31 is not particularly limited as long as it is in a three-dimensional shape having a cavity being an accommodating part. For example, it may be in a cylindrical shape or a horn shape. The reduction electrode chamber 43 has a first inflow port 45 for introducing the first electrolytic solution, and a first outflow port 46 for discharging the first electrolytic solution containing a product. The oxidation electrode chamber 44 has a second inflow port 47 for introducing the second electrolytic solution, and a second outflow port 48 for discharging the second electrolytic solution containing a product. The reduction electrode chamber 43 and the oxidation electrode chamber 44 are partitioned from each other, for example, by the ion exchange membrane 40.

The photoelectric conversion layer 32 has a surface electrically connected to the oxidation catalyst layer 33 and a surface electrically connected to the reduction catalyst layer 36 via the wire 39, and has a function of performing charge separation by emitted light energy of sunlight or the like. Electrons generated by the charge separation move to the reduction electrode layer side, and holes move to the oxidation electrode layer side. Thus, the photoelectric conversion layer 32 can generate electromotive force. As the photoelectric conversion layer 32, for example, a pn junction type or pin junction type photoelectric conversion layer can be used. Examples of semiconductor for use include silicone, germanium, silicon germanium, and GaAs, GaInP, AlGaInP, CdTe, CuInGaSe as compound semiconductor system, and they are applicable in single crystalline, polycrystalline, and amorphous forms. Besides, to obtain high open-circuit voltage, a multijunction photoelectric conversion layer is more preferable.

Between the oxidation catalyst layer and the photoelectric conversion layer, a transparent conductive film may be arranged. The oxidation catalyst layer 33 has light transmitting property. The oxidation catalyst layer 33 and the oxidation electrode layer 34 can be recognized, in combination, as an oxidation electrode. The reduction catalyst layer 36 and the reduction electrode layer 37 can be recognized, in combination, as a reduction electrode.

The first insulator 35 is provided to cover side surfaces of the photoelectric conversion layer 32, the oxidation catalyst layer 33, and the oxidation electrode layer 34 and the rear surface of the oxidation electrode layer 34. The second insulator 38 is provided to cover the side surface and the rear surface of the reduction electrode layer 37.

Since the photoelectric conversion layer 32, the oxidation catalyst layer 33, and the oxidation electrode layer 34 are immersed in the second electrolytic solution 42, provision of the first insulator 35 makes it possible to suppress the leakage current from the photoelectric conversion layer 32 and suppress erosion of the photoelectric conversion layer 32 by the second electrolytic solution 42.

The electrochemical reaction cell 30, when irradiated with light, occurs oxidation-reduction reaction of $CO_2$ and water in the electrolytic solutions due to the oxidation catalyst and the reduction catalyst by the electromotive force generated in the semiconductor layer.

Therefore, the photoelectric conversion layer needs to have an open-circuit voltage equal to or more than the potential difference between the standard oxidation-reduction potential of the oxidation reaction caused by the oxidation catalyst and the standard oxidation-reduction potential of the reduction reaction caused by the reduction catalyst. For example, when holes generated in the photoelectric conversion layer move to the oxidation catalyst and electrons move to the reduction catalyst to cause an oxidation reaction of water by the oxidation catalyst and cause a reduction reaction from $CO_2$ to CO in the catalyst layer, the reactions can be expressed by the following reaction formulas.

Oxidation side $2H_2O + 4h^1 \rightarrow 4H^1 + O2$      Formula 1

Reduction side $2CO_2 + 4H^+ \rightarrow 2CO + 2H_2O$      Formula 2

The standard oxidation-reduction potential in the reaction in Formula 1 is 1.23 V/vs. NHE, and is −0.1 V in Formula 2. Therefore, the open-circuit voltage of the semiconductor layer needs to be 1.33 V or higher. It is more preferable that the semiconductor layer desirably has an open-circuit voltage corresponding to the potential difference including overvoltage. For example, when it is assumed that the overvoltage is 0.2 V in each Formula 1, 2, the open-circuit voltage is 1.73 V or higher.

The configuration in which the solar cell is included in the reaction vessel as described above eliminates the needs of the external power supply and provides the same effects as those in the first embodiment.

Third Embodiment

Figure 4:
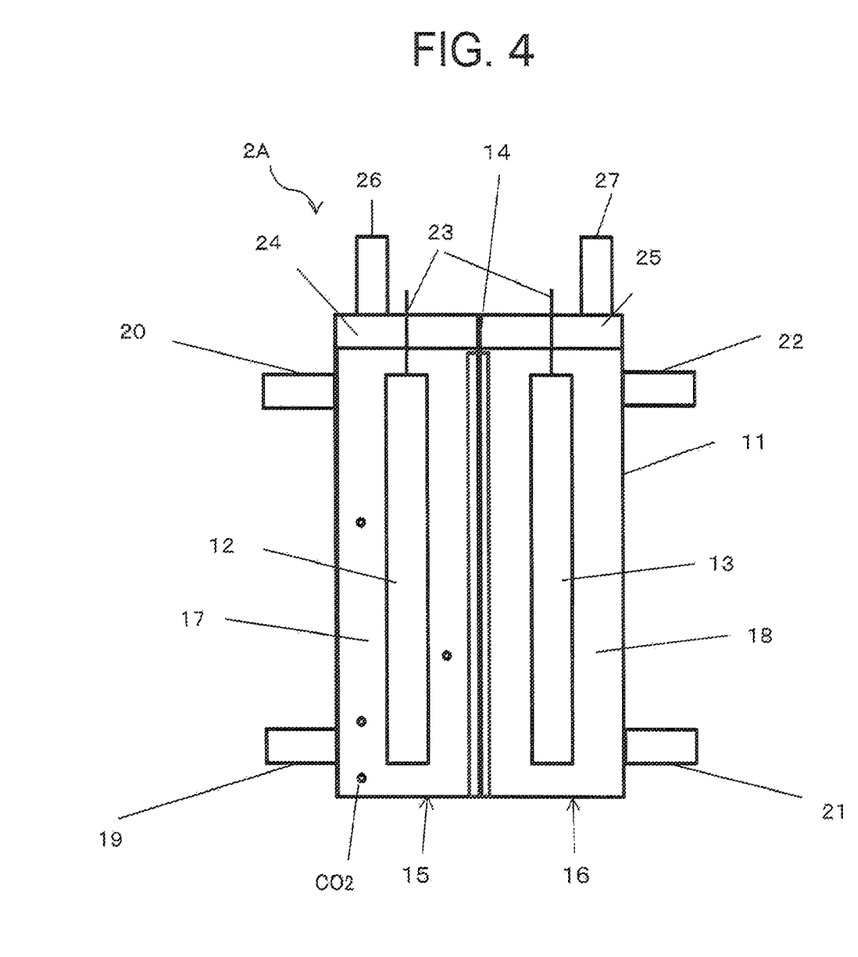
FIG. 4 is a schematic diagram illustrating a configuration example of an electrochemical reaction cell according to a third embodiment.

An electrochemical reaction cell according to a third embodiment will be described referring to FIG. 4. FIG. 4 is a diagram illustrating an electrochemical reaction cell 2A according to the third embodiment. Note that in the electrochemical reaction cell 2A of the third embodiment, the same parts as those of the electrochemical reaction cell 2 in the first embodiment are denoted by the same reference signs, and description thereof may be omitted in some cases. Note that the kinds of the electrolytic solutions, the components of the electrochemical reaction cell and the like are the same as those of the first embodiment.

The electrochemical reaction cell 2A illustrated in FIG. 4 has a gas/liquid separating unit function in a reaction vessel.

This configuration makes it possible to simplify the electrochemical reaction device and reduce the cost of the system.

The electrochemical reaction cell 2A illustrated in FIG. 4 includes, in a reaction vessel 11, a reduction electrode 12 that reduces $CO_2$, an oxidation electrode 13, and an ion exchange membrane 14 between the reduction electrode and the oxidation electrode. The ion exchange membrane 14 forms a reduction electrode chamber 15 and an oxidation electrode chamber 16, and the reduction electrode chamber 15 is filled with a first electrolytic solution 17 and the oxidation electrode chamber 16 is filled with a second electrolytic solution 18. The reduction electrode chamber 15 has a first inflow port 19 for introducing the first electrolytic solution, and a first outflow port 20 for discharging the first electrolytic solution containing a product. The oxidation electrode chamber 16 has a second inflow port 21 for introducing the second electrolytic solution, and a second outflow port 22 for discharging the second electrolytic solution containing a product.

At an upper portion of the reduction electrode chamber 15, a first head space 24 is provided which accommodates a first gas component such as gas reduction product such as CO, hydrogen being by-product, unreacted $CO_2$ and the like. At an upper portion of the oxidation electrode chamber 16, a second head space 25 is provided which accommodates a gas oxidation product being a second gas component. The first head space 24 has an outflow port 26 for taking out the already-described first gas component separated from the first electrolytic solution and sending it to the first gas/liquid mixing unit. The second head space 25 has an outflow port 27 for taking out the second gas component separated from the second electrolytic solution. The first gas component taken out from the outflow port 26 is mixed again, in the first gas/liquid mixing unit, with the first electrolytic solution sent from the outflow port 20. In this event, only the unreacted $CO_2$ selectively dissolves again into the first electrolytic solution and thus can be separated from the gas reduction product such as CO.

The head spaces are provided at the upper portions of the electrochemical reaction cell to integrate the electrochemical reaction cell and the gas/liquid separating unit as described above, thereby simplifying the system and providing the same effects as those in the first embodiment.

Fourth Embodiment

Figure 5:
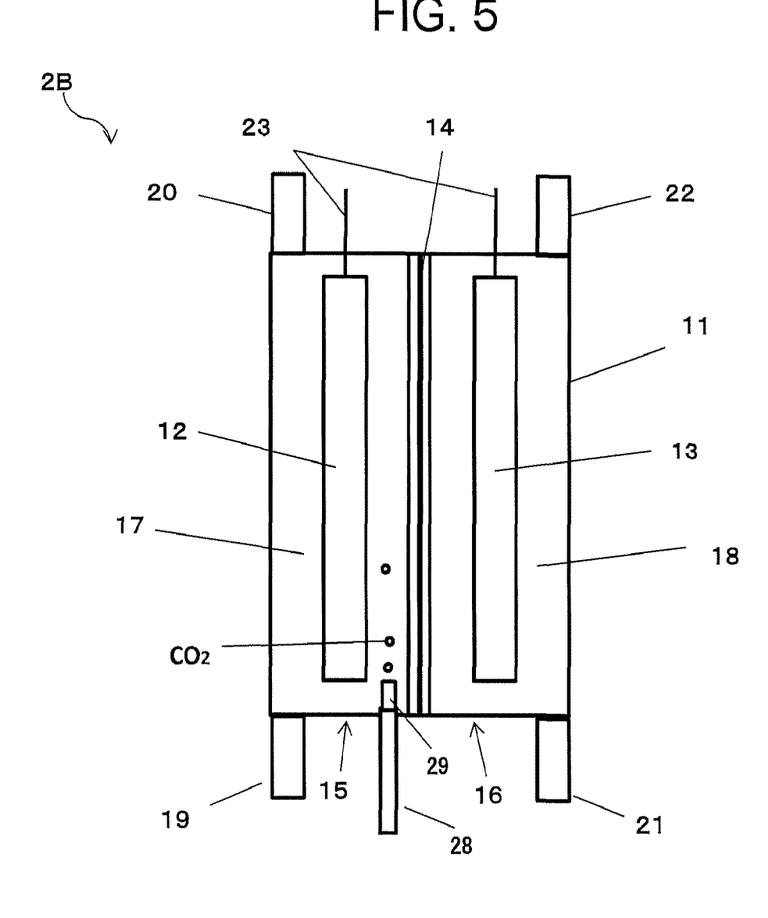
FIG. 5 is a schematic diagram illustrating a configuration example of an electrochemical reaction cell according to a fourth embodiment.

An electrochemical reaction cell according to a fourth embodiment will be described referring to FIG. 5. FIG. 5 is a diagram illustrating an electrochemical reaction cell 2B according to the fourth embodiment. Note that in the electrochemical reaction cell 2B of the fourth embodiment, the same parts as those of the electrochemical reaction cell 2 in the first embodiment are denoted by the same reference signs, and description thereof may be omitted in some cases. Note that the kinds of the electrolytic solutions, the components of the electrochemical reaction cell and the like are the same as those of the first embodiment.

The electrochemical reaction cell 2B illustrated in FIG. 5 has a function of a second gas/liquid mixing unit 600 in a reduction electrode chamber 15. More specifically, at a lower portion of the reduction electrode chamber 15, an inflow port 28 for introducing a $CO_2$ gas directly into the reduction electrode chamber is provided. The $CO_2$ gas introduced from the inflow port 28 into the reduction electrode chamber 15 comes into contact with the first electrolytic solution in the reduction electrode chamber 15 and dissolves therein. In this case, providing an air diffusion part 29 connected to the inflow port 28 makes the $CO_2$ gas fine into bubbles and can increase its diffusion efficiency. The air diffusion part preferably has a porous structure of an inorganic material such as glass, ceramics or the like, an organic membrane film or the like.

In this embodiment, the first electrolytic solution discharged from an outflow port 303 of a first gas/liquid mixing unit 300 is returned from an inflow port 19 directly into the reduction electrode chamber of the electrochemical reaction cell, and the $CO_2$ gas introduced from the inflow port 28 is dissolved in the first electrolytic solution in the reduction electrode chamber.

The reduction electrode chamber and the second gas/liquid mixing unit function are made into an integral type as described above to supply carbon dioxide directly to the reduction electrode chamber, thereby simplifying the electrochemical reaction device and reducing the cost of the system as well as providing the same effects as those in the first embodiment.

EXAMPLES

Next, examples of the present invention and their evaluation results will be described.

Example 1

The electrochemical reaction device 100 illustrated in FIG. 6 was configured as follows.

An acrylic vessel was used as the reaction vessel of the electrochemical reaction cell, and an anion exchange membrane (ASAHI GLASS CO., LTD., Selemion (registered trademark)) was used as the ion exchange membrane and arranged at the center portion of the reaction vessel. As the reduction electrode, the one made by spray-coating an Au nanoparticle carrying carbon catalyst onto carbon paper was used, and as the oxidation electrode, a nickel hydroxide/Ni porous electrode obtained by electrodepositing nickel nitrate on a Ni porous body was used.

The electrochemical reaction cell is driven with the reduction electrode connected to the negative electrode of the solar cell and the oxidation electrode connected to the positive electrode. In this example, six single-crystal Si solar cells connected in series were used. In the previous measurement, the efficiency of the solar cell was 15%, and the open-circuit voltage was 3.6 V. In this example, the electrodes were electrically connected directly to the solar cell, but a DC-DC converter can be disposed between the solar cell and the electrodes to operate a $CO_2$ reduction cell by constant potential operation.

The gas reaction products generated in the reduction electrode chamber and the oxidation electrode chamber of the electrochemical reaction cell were transported to the first and second gas/liquid separating units together with the electrolytic solutions and each separated into the electrolytic solution and the gas reaction product. In this example, as the gas/liquid separating unit, a vessel made of glass was used.

The gas component containing the gas reduction reaction product and the electrolytic solution separated in the first gas/liquid separating unit were sent to the first gas/liquid mixing unit from different outflow ports respectively. As the first gas/liquid separating unit, a cylindrical SUS vessel was used. The gas component containing the gas reduction reaction product was made to pass through an air diffusion pipe (inflow port 302) in the first gas/liquid mixing unit and mixed again into the electrolytic solution in the first gas/liquid mixing unit by bubbling, and then the gas component discharged from the outflow port 304 was collected.

The electrolytic solution discharged from the outflow port 303 was subsequently sent to the second gas/liquid mixing unit. The second gas/liquid mixing unit was also configured, similarly to the first gas/liquid mixing unit, such that an air diffusion pipe (inflow port 603) made of a glass filter was attached to a cylindrical SUS vessel and its tip end portion was immersed in the electrolytic solution. By introducing CO2 from the air diffusion pipe, fine $CO_2$ bubbles were formed in the electrolytic solution, and the electrolytic solution and the $CO_2$ gas was efficiently mixed together. The first electrolytic solution containing $CO_2$ was sent via a pump and returned to the reduction electrode chamber of the electrochemical reaction cell.

The gas product such as oxygen separated in the second gas/liquid separating unit was released into the atmosphere, and the electrolytic solution was sent via a pump and returned into the oxidation electrode chamber of the electrochemical reaction cell.

In this example, 1M KHCO3 solution was used as both the first and second electrolytic solutions.

Note that valves such as a check valve, a safety valve and so on are not illustrated in FIG. 6 but are provided as needed.

Evaluation was carried out using this apparatus.

Comparative Example 1

An electrochemical reaction device that is the same as that in Example 1 except that the first gas/liquid mixing unit is not provided was used for evaluation.

For evaluation of Example 1 and Comparative Example 1, a solar simulator (AM 1.5, 1000 W/m$^2$) was used. Irradiation of the solar cell of the solar simulator was performed for a certain period of time, the gas discharged from the first gas/liquid mixing unit was collected in Example 1 and the gas discharged from the first gas/liquid separating unit was collected in Comparative Example 1, and their $CO_2$ concentrations were measured using a $CO_2$ concentration meter.

As a result of the measurement, the $CO_2$ concentration in the collected gas in Example 1 was lower than the $CO_2$ concentration in Comparative Example 1.

From the result, it was found that the unreacted $CO_2$ was removed in the first gas/liquid mixing unit before collection of the gas reduction reaction product in Example 1 in which the first gas/liquid mixing unit was provided. In other words, the effect of obtaining a high-purity gas reaction product simply and with low energy was confirmed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The inventions described in the accompanying claims and their equivalents are intended to cover such forms or modifications as would fall within the scope and spirit of the inventions.

What is claimed is:

1. An electrochemical reaction device comprising:
a reaction vessel comprising a first accommodating part configured to accommodate a first electrolytic solution containing carbon dioxide, a second accommodating part configured to accommodate a second electrolytic solution containing water, a first inflow port for introducing the first electrolytic solution containing the carbon dioxide to the first accommodating part, a first outflow port for discharging the first electrolytic solution containing a first gas component from the first accommodating part, a second inflow port for introducing the second electrolytic solution to the second accommodating part, and a second outflow port for discharging the second electrolytic solution containing a second gas component from the second accommodating part;
a reduction electrode disposed in the first accommodating part;
an oxidation electrode disposed in the second accommodating part;
a power supply connected to the reduction electrode and the oxidation electrode;
a first gas/liquid separating unit configured to separate the first electrolytic solution and the first gas component containing a gas reduction product and the carbon dioxide, and comprising a third inflow port for introducing the first electrolytic solution containing the first gas component discharged from the first outflow port, a third outflow port for discharging the first gas component separated from the first electrolytic solution, and a fourth outflow port for discharging the first electrolytic solution from which the first gas component is separated;
a first gas/liquid mixing unit configured to mix the first gas component with the first electrolytic solution, and comprising a fourth inflow port for introducing the first electrolytic solution discharged from the fourth outflow port, a fifth inflow port for introducing the first gas component discharged from the third outflow port, a fifth outflow port for discharging the first electrolytic solution in which the carbon dioxide is dissolved, and a sixth outflow port for taking out the gas reduction product not dissolving in the first electrolytic solution; and
a second gas/liquid mixing unit configured to dissolve carbon dioxide in the first electrolytic solution, and comprising a sixth inflow port for introducing the first electrolytic solution discharged from the fifth outflow port, a seventh inflow port for introducing the first electrolytic solution from a first electrolytic solution tank, an eighth inflow port for injecting carbon dioxide from a carbon dioxide tank into the first electrolytic solution introduced from the sixth inflow port and the seventh inflow port, and a seventh outflow port for sending the first electrolytic solution in which the carbon dioxide dissolves to the first inflow port.

2. The device according to claim 1, further comprising:
a second gas/liquid separating unit configured to separate the second gas component from the second electrolytic solution.

3. The device according to claim 1, further comprising:
a first circulation channel to send the first electrolytic solution discharged from the sixth outflow port to the first inflow port.

4. The device according to claim 2, further comprising:
a second circulation channel to send the second electrolytic solution discharged from the second gas/liquid separating unit to the second inflow port.

5. The device according to claim 1, wherein the gas reduction product contains at least one selected from the group consisting of carbon monoxide, methane, ethane, and ethylene.

6. The device according to claim 1, wherein the power supply is driven with renewable energy of sunlight, wind power, geothermal power, or tidal power.

7. The device according to claim 1, wherein the power supply comprises a photoelectric conversion body having a first surface electrically connected to the reduction electrode and a second surface electrically connected to the oxidation electrode.

8. An electrochemical reaction device comprising:
a reaction vessel comprising a first accommodating part configured to accommodate a first electrolytic solution containing carbon dioxide, a second accommodating part configured to accommodate a second electrolytic solution containing water, a first head space configured to accommodate a first gas component containing a gas reduction product and the carbon dioxide at an upper portion of the first accommodating part, a second head space configured to accommodate a second gas component at an upper portion of the second accommodating part, a first inflow port for introducing the first electrolytic solution containing the carbon dioxide to the first accommodating part, a first outflow port for discharging the first electrolytic solution from the first accommodating part, a second outflow port for discharging the first gas component from the first head space, a second inflow port for introducing the second electrolytic solution to the second accommodating part, a third outflow port for discharging the second electrolytic solution from the second accommodating part, and a fourth outflow port for discharging the second gas component from the second head space;
a reduction electrode disposed in the first accommodating part;
an oxidation electrode disposed in the second accommodating part;
a power supply connected to the reduction electrode and the oxidation electrode;
a first gas/liquid mixing unit configured to mix the first gas component with the first electrolytic solution, and comprising a third inflow port for introducing the first electrolytic solution discharged from the first outflow port, a fourth inflow port for introducing the first gas component discharged from the second outflow port, a fifth outflow port for discharging the first electrolytic solution in which the carbon dioxide is dissolved, and a sixth outflow port for taking out the gas reduction product not dissolving in the first electrolytic solution; and
a second gas/liquid mixing unit configured to dissolve carbon dioxide in the first electrolytic solution, and comprising a fifth inflow port for introducing the first electrolytic solution discharged from the fifth outflow port, a sixth inflow port for introducing the first electrolytic solution from a first electrolytic solution tank, an seventh inflow port for injecting carbon dioxide from a carbon dioxide tank into the first electrolytic solution introduced from the fifth inflow port and the sixth inflow port, and a seventh outflow port for sending the first electrolytic solution in which the carbon dioxide is dissolved to the first inflow port.

* * * * *

UNITED STATES PATENT AND TRADEMARK OFFICE
CERTIFICATE OF CORRECTION

PATENT NO. : 10,458,024 B2
APPLICATION NO. : 15/703386
DATED : October 29, 2019
INVENTOR(S) : Ryota Kitagawa et al.

Page 1 of 1

It is certified that error appears in the above-identified patent and that said Letters Patent is hereby corrected as shown below:

On the Title Page

Item (72), the 1st inventor's name is incorrect. Item (72) should read:
-- (72) Inventors: Ryota Kitagawa, Setagaya (JP); Satoshi Mikoshiba, Yamato (JP); Akihiko Ono, Kita (JP); Yuki Kudo, Yokohama (JP); Jun Tamura, Chuo (JP); Eishi Tsutsumi, Kawasaki (JP); Yoshitsune Sugano, Kawasaki (JP); Asahi Motoshige, Ota (JP); Masakazu Yamagiwa, Yokohama (JP); Arisa Yamada, Kawasaki (JP) --

Signed and Sealed this
Twenty-fourth Day of December, 2019

Andrei Iancu
*Director of the United States Patent and Trademark Office*